United States Patent [19]

Eshraghian

[11] 3,863,153

[45] Jan. 28, 1975

[54] SPEED MEASUREMENT AND INDICATION APPARATUS

[75] Inventor: Kamran Eshraghian, Hillcrest, Australia

[73] Assignee: U.S. Philips Corporation, New York, N.Y.

[22] Filed: Nov. 10, 1972

[21] Appl. No.: 305,380

[30] Foreign Application Priority Data
Nov. 10, 1971   Australia............................ 6954/71

[52] U.S. Cl.............................. 324/166, 235/92 EA
[51] Int. Cl......................... G01p 3/48, H03k 21/18
[58] Field of Search ....... 324/162, 166, 166 D, 161, 324/173, 78 D; 235/92 EA

[56] References Cited
UNITED STATES PATENTS

| 3,525,044 | 8/1970 | Richmond | 324/173 |
| 3,683,159 | 8/1972 | Welch et al. | 235/92 EA |
| 3,705,296 | 12/1972 | Kochi | 235/92 EA |

Primary Examiner—Alfred E. Smith
Assistant Examiner—Rolf Hille
Attorney, Agent, or Firm—Frank R. Trifari; Simon L. Cohen

[57] ABSTRACT

A speed indicating device where a pulse train having a frequency corresponding to the speed is periodically counted. The contents of the counter are sampled and displayed periodically. The sampling frequency of the counter is increased in response to the absolute value of the rate of change of the speed indicating pulse train frequency.

7 Claims, 17 Drawing Figures

SPEED MEASUREMENT AND INDICATION APPARATUS

The present invention relates to speed measurement and indication apparatus of the kind comprising a counter producing counter information and adapted to count the number of pulses of a signal pulse train occurring during each of a succession of measurement intervals of fixed duration, the pulse recurrence frequency of the signal pulse train being related to the speed to be measured and indicated. The apparatus also includes an indicator for displaying in digital form the information present at the output of a gated storage circuit the input of which is supplied with the counter information, the storage circuit being arranged to be so gated by sampling pulses applied thereto that during the presence of a sampling pulse the input information of the storage circuit is transferred to the output whereas the input information present at the time of the cessation of the sampling pulse is retained at the output of the storage circuit until the occurrence of the next succeeding sampling pulse, each applied sampling pulse terminating a measurement interval.

In known apparatus of the kind to which the invention relates, a reference pulse generator is provided to produce a first reference pulse train and a second reference pulse train. The pulses of the second reference pulse train having a fixed time relationship to the pulses of the first reference pulse train. The counter is re-set to zero at the occurrence of each pulse of the first reference pulse train. Each pulse of the second reference pulse train is applied as a sampling pulse.

Accordingly, in the known apparatus, the commencement of each measurement interval is determined by a pulse of the first reference pulse train and the termination of each measurement interval is determined by a pulse of the second reference pulse train.

It is advantageous in the known apparatus for the reference pulse generator to comprise a constant frequency relaxation oscillator, the output of which is fed to a delay circuit, the second reference pulse train being derived from the output of the relaxation oscillator and the first reference pulse train being derived from the output of the delay circuit.

A common application of speed measurement and indication apparatus of the kind to which the invention relates is for the measurement and indication of the speed of a motor vehicle, the signal pulse train being derived from a transducer located in the gear box of the vehicle or in some other suitable position, whereby the pulse recurrence frequency of the signal pulse train is proportional to the speed of the vehicle.

In known apparatus of the kind to which the invention relates, sampling pulses are derived from the second reference pulse train whereby the supply of counter information to the indicator is periodically updated in fixed time relation to a pulse of the first reference pulse train resetting the counter. For instance, in the known apparatus, the supply of counter information to the indicator may be updated periodically at intervals ranging from 0.2 to 1.0 seconds.

A first serious drawback of the known apparatus is that if the supply of counter information to the indicator is arranged to be periodically updated at relatively lengthy intervals while a satisfactory indication of speed is provided for relatively constant speeds, the indication is unsatisfactory when the speed is rapidly increasing or decreasing as the indicated speed changes only in relatively large steps. On the other hand, if the counter information is arranged to be periodically updated at relatively short intervals, while a satisfactory indication of speed is provided as the speed is rapidly increasing or decreasing, the indication is unsatisfactory for relatively constant speeds since the indicated speed is then continuously changing in small steps.

The known apparatus has a second serious drawback since, as the counting intervals recur periodically and when the speed is constant and the pulse recurrence frequency of the signal pulse train is also constant it is possible for the number of pulses of the signal pulse train spanned by the measurement interval of fixed duration to vary during a succession of measurement intervals producing undesirable alternation of the indicated output between two neighboring digits.

The present invention seeks to improve upon the known apparatus.

A speed measurement and indication apparatus in accordance with a primary aspect of the present invention comprises a counter producing counter information and adapted to count the number of pulses of a signal pulse train occurring during each of a succession of measurement intervals of fixed duration, the pulse recurrence frequency of the signal pulse train being related to the speed to be measured and indicated. The apparatus also includes an indicator for displaying in digital form the information present at the output of a gated storage circuit the input of which is supplied with the counter information, and a sampling pulse source for supplying sampling pulses to the storage circuit via pulse rate modifying means. The storage circuit is arranged to be so gated by the sampling pulses applied thereto that during the presence of a sampling pulse the input information of the storage circuit is transferred to the output thereof whereas the input information present at the time of cessation of the sampling pulse is retained at the output of the storage circuit until the occurrence of the next succeeding sampling pulse. Each applied sampling pulse is substantially coincident with termination of a measurement interval. The pulse rate modifying means is responsive to the rate of change or the speed being measured whereby the recurrence rate of the applied sampling pulses is determined by the rate of change of speed.

As with the aforementioned known apparatus, an apparatus in accordance with this primary aspect may be provided with a reference pulse generator to produce a first reference pulse train and a second reference pulse train, the pulses of the second reference pulse train having a fixed time relationship to the pulses of the first reference pulse train, the counter being re-set to zero at the occurrence of each pulse of the first reference pulse train and sampling pulses being derived from pulses of the second reference pulse train. However, if so provided, each pulse of the second reference pulse train is not applied as a sampling pulse. Instead only certain pulses of the second reference pulse train are applied as sampling pulses or sampling pulses are only derived from certain pulses of the second reference pulse train.

In an apparatus in accordance with this primary aspect, provision may be made for the recurrence rate of applied sampling pulses to be increased or decreased substantially continuously with increase or decrease of the rate of change of the speed being measured or alternatively provision may be made for the recurrence rate of the applied sampling pulses to be increased or decreased in a stepwise manner with increase or decrease of the rate of change of the speed being measured.

In one version of an apparatus in accordance with this primary aspect of the invention in which the recurrence rate of applied sampling pulses is varied in a substantially constant manner, the apparatus includes a variable frequency pulse generator to produce a variable frequency pulse train, comprising pulses having a duration substantially equal to the period of the reference pulse generator. The frequency of the variable frequency pulse generator is controlled by the rate of change of the signal pulse train and a coincidence circuit fed by the variable frequency pulse train and by the second reference pulse train to produce sampling pulses which are supplied to the gated storage circuit. A sampling pulse is supplied at each occurrence of a pulse of the second reference pulse train within the duration of a pulse of the variable frequency pulse train. In such a version, each measurement interval is terminated by an applied sampling pulse and may be commenced by the re-setting of the counter to zero by the pulse of the first reference pulse train immediately preceding the sampling pulse in time.

In another version of an apparatus in accordance with this primary aspect of the invention but in which the recurrence rate of the applied sampling pulses is varied in a step-wise manner, the applied sampling pulses are derived from pulses of the second reference pulse train. Pulse frequency dividing means are provided via which sampling pulses may be derived. A control means sensitive to the rate of change of the recurrence frequency of the signal pulse train is associated with the pulse frequency dividing means to determine whether or not the applied sampling pulses are derived via the pulse frequency dividing means. In such a version, again each measurement interval is terminated by an applied sampling pulse and may be commenced by the re-setting of the counter to zero by the pulse of the first reference pulse train immediately preceding the sampling pulse in time.

The aforementioned first serious drawback is overcome in apparatus in accordance with this primary aspect of the invention.

It will be appreciated that in apparatus in accordance with this primary aspect every re-setting of the counter is not followed by a sampling pulse before the next re-setting of the counter. Thus, there are a succession of count intervals, some of which are measurement intervals and some of which are not measurement intervals. Of course, an indication of speed is provided only in relation to count intervals that are measurement intervals. A speed measurement and indication apparatus in accordance with a secondary aspect of the present invention comprises a counter adapted to count the number of pulses of a signal pulse train occurring during each of a succession of count intervals, the pulse recurrence frequency of the signal pulse train being related to the speed to be measured and indicated. The apparatus further comprises an indicator for displaying in digital form the information present at the output of a gated storage circuit, the input of which is supplied with counter information. The storage circuit is arranged to be so gated by sampling pulses applied thereto, each sampling pulse being related to a particular measurement interval, so that during the presence of a sampling pulse the counter information at the input of the storage circuit for the measurement interval is transferred to the output thereof, the counter information present at the time of cessation of the sampling pulse being retained at the output of the storage circuit until the occurrence of the next succeeding sampling pulse. A synchronizing means is arranged to receive the signal pulse train and initiate, in response to a pulse of said signal pulse train occurring subsequent to a count interval, a further count interval and to produce a transfer pulse, from which may be derived a sampling pulse, substantially coincident with the termination of the further count interval. Thus, each sampling pulse terminates a measurement interval the commencement of which is the commencement of the count interval with which the sample pulse is associated.

As with the aforementioned known apparatus, an apparatus in accordance with this secondary aspect may be provided with a reference pulse generator to produce a first reference pulse train and a second reference pulse train, the pulses of the second reference pulse train having a fixed time relationship to the pulses of the first reference pulse train, the counter being re-set to zero at the occurrence of each pulse of the first reference pulse train and sampling pulses being derived from pulses of the second reference pulse train each cycle of the reference pulse generator being initiated by the said pulse initiating the said further count interval. Of course, with such arrangement, in distinction from the known apparatus, the commencement of each measurement interval is not determined by a pulse of the first reference pulse train even though a pulse of the first reference pulse train re-sets the counter to zero. Accordingly, the counter must be prevented from counting pulses of the signal pulse train occurring between the instant that the counter is re-set to zero and the instant of commencement of the measurement interval. This may be accomplished by a gating circuit in the signal path inhibiting supply of the signal pulse train between the instants referred to, the gating circuit providing inhibition in response to the pulses of the first reference pulse train and being released from inhibition in response to each said pulse initiating each said further count interval.

The invention will now be described with reference to the accompanying drawings in which.

Figure 5:
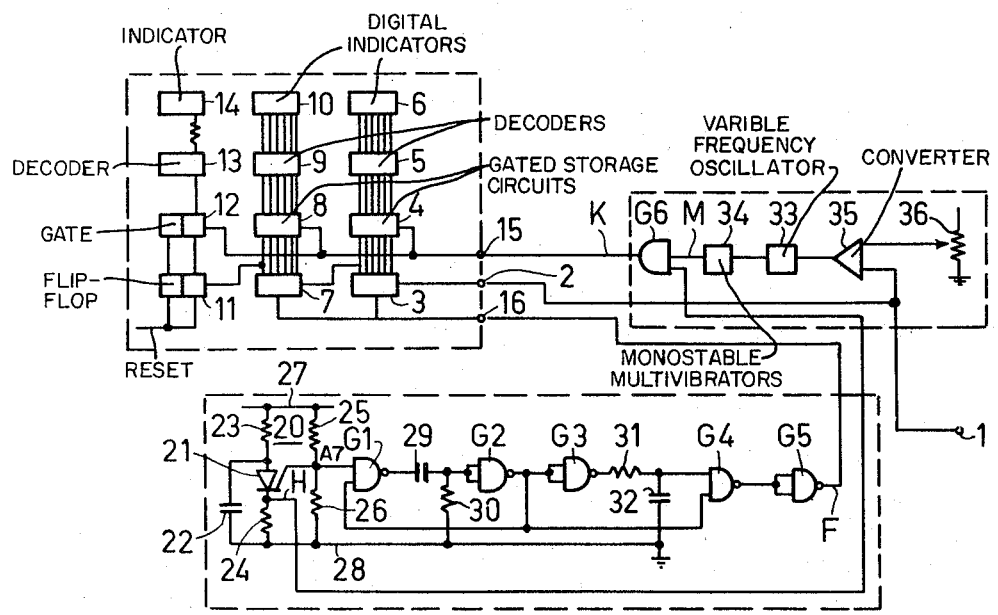
FIG. 5 is a more detailed schematic diagram of speed measurement and indication apparatus basically similar to the apparatus of FIG. 2.
Figure 6:
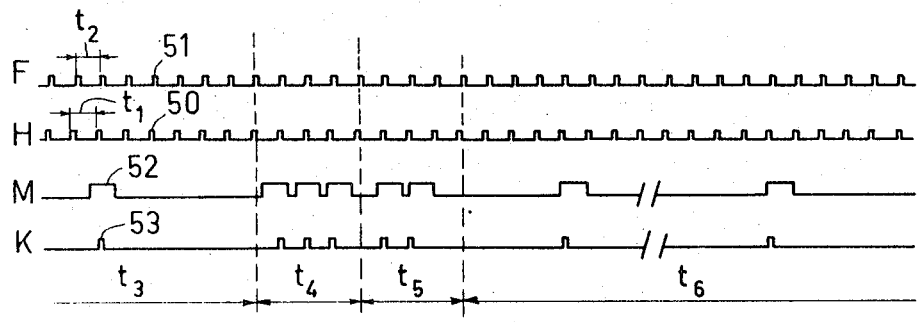

FIG. 6 diagrammatically illustrates the waveforms present at various parts of the circuit of FIG. 5 when the apparatus is in operation.

Figure 4:
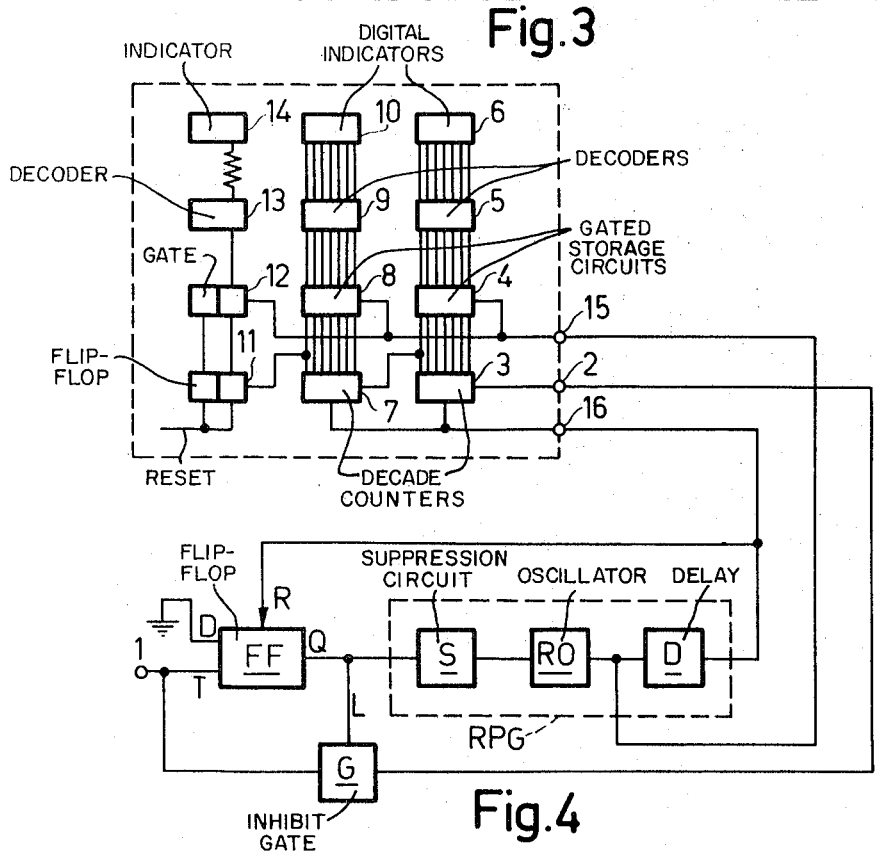
FIG. 4 is a block schematic diagram of another speed measurement and indication apparatus in accordance with a secondary aspect of the present invention.
Figure 7:
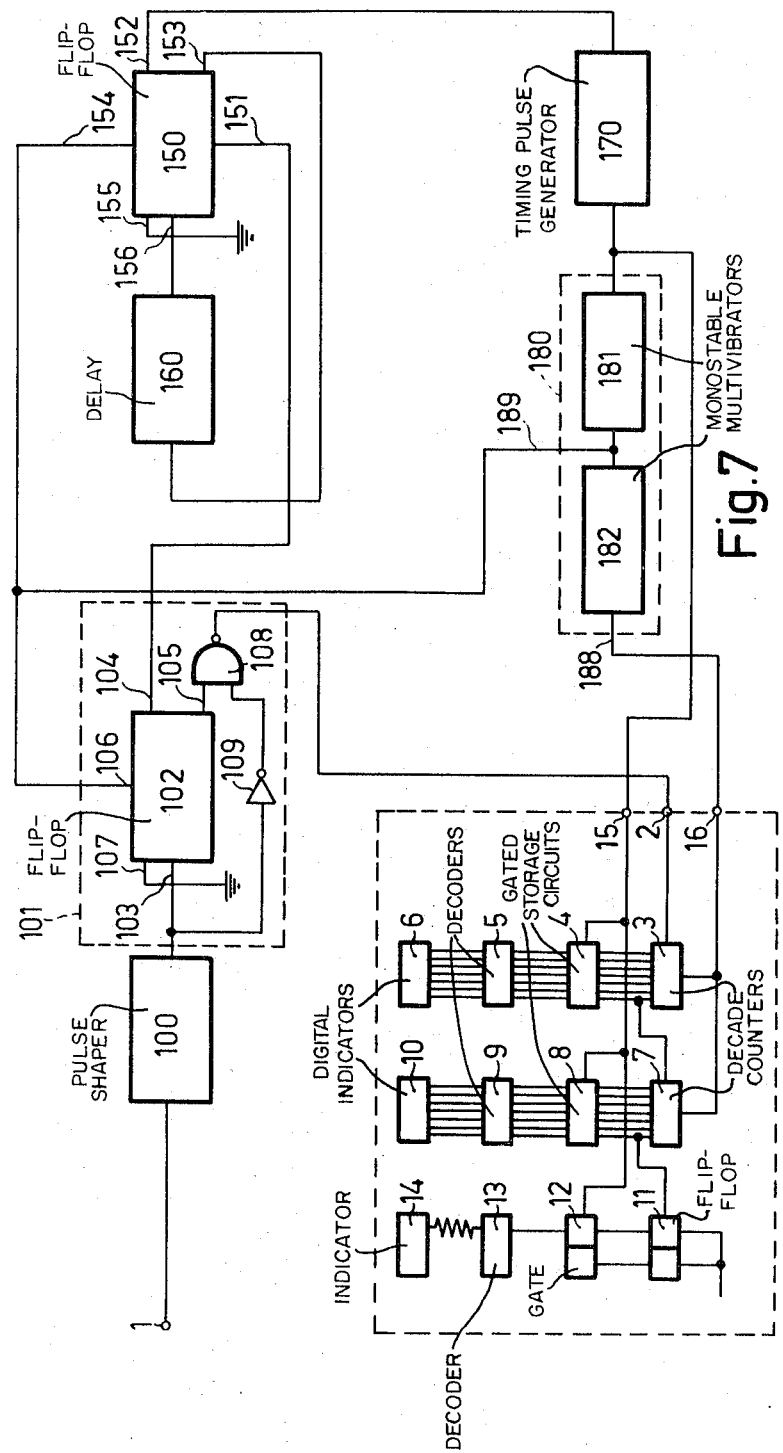

FIG. 7 is a more detailed block schematic diagram of speed measurement and indication apparatus basically similar to the apparatus of FIG. 4.

Figure 8:
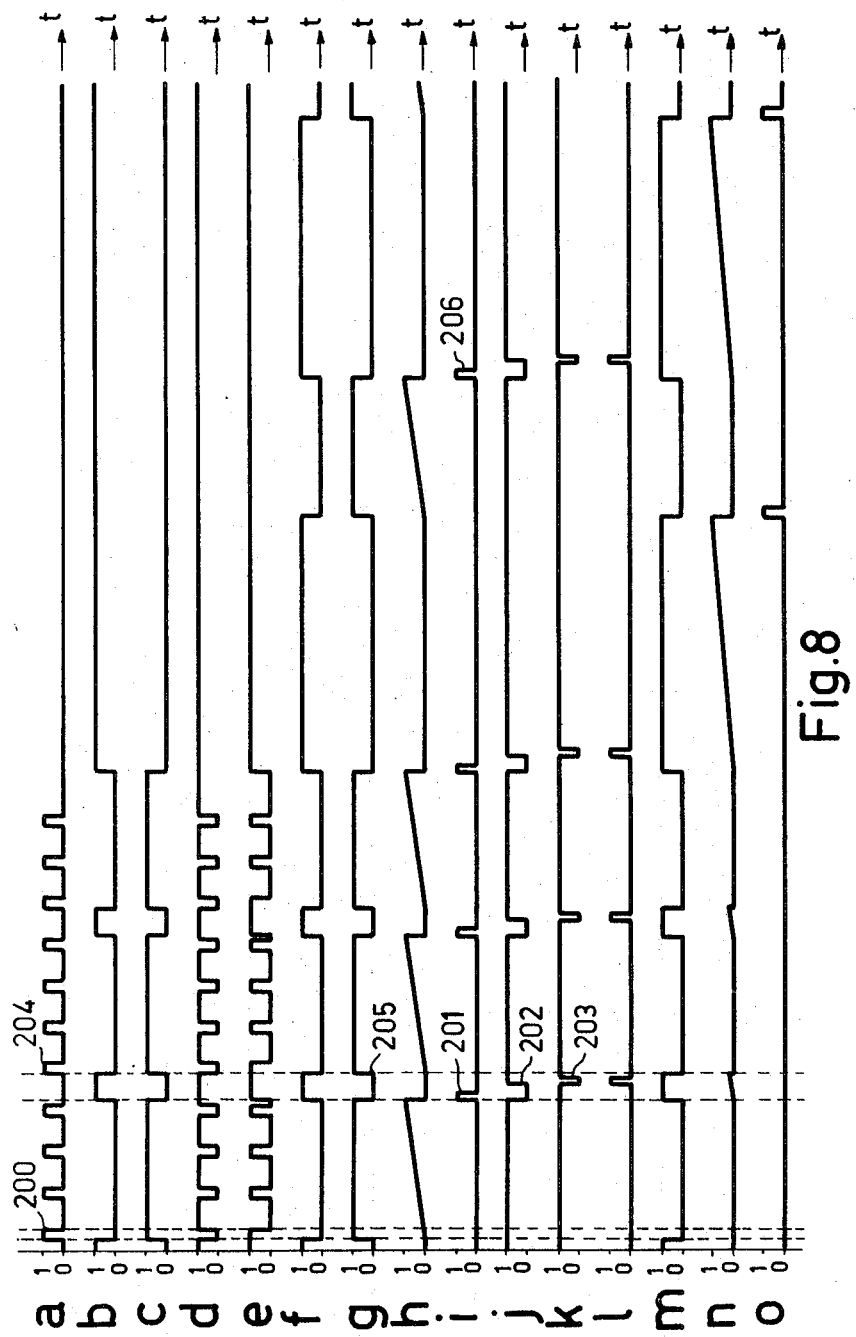

FIG. 8, diagrammatically illustrates the waveforms present at various points of the circuit of FIG. 7 and figures associated therewith when the apparatus is in operation.

Figure 9:
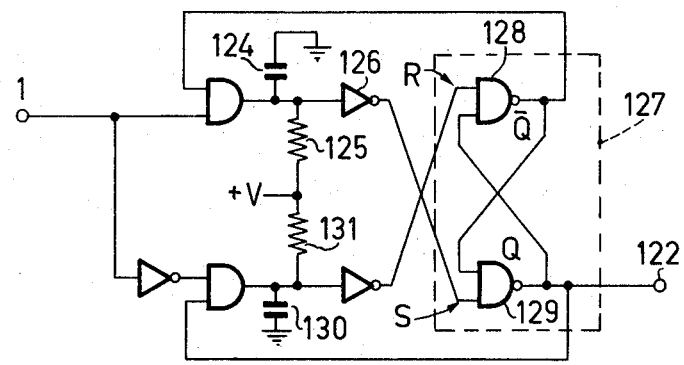

FIG. 9 is a circuit diagram of part of the apparatus of FIG. 7.

Figure 10:
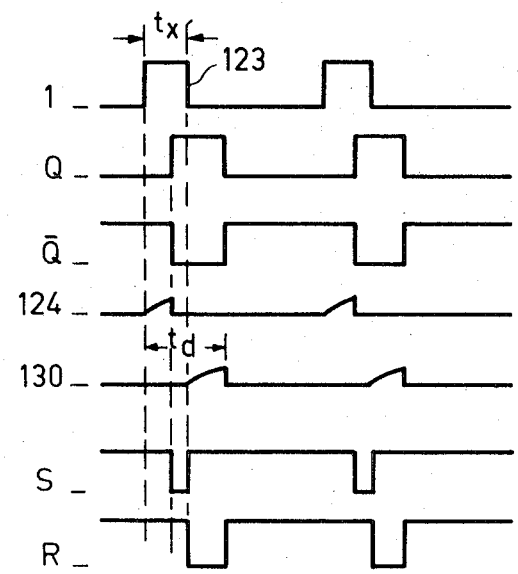

FIG. 10 diagrammatically illustrates the waveforms present at various parts of the circuit of FIG. 9.

Figure 13:
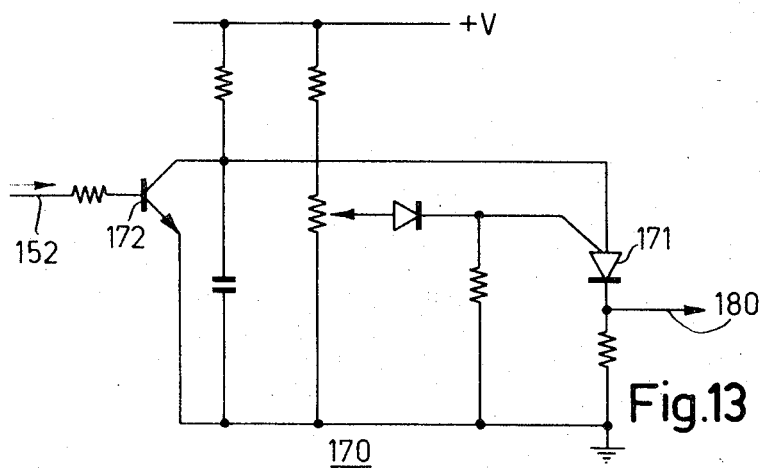
Figure 14:
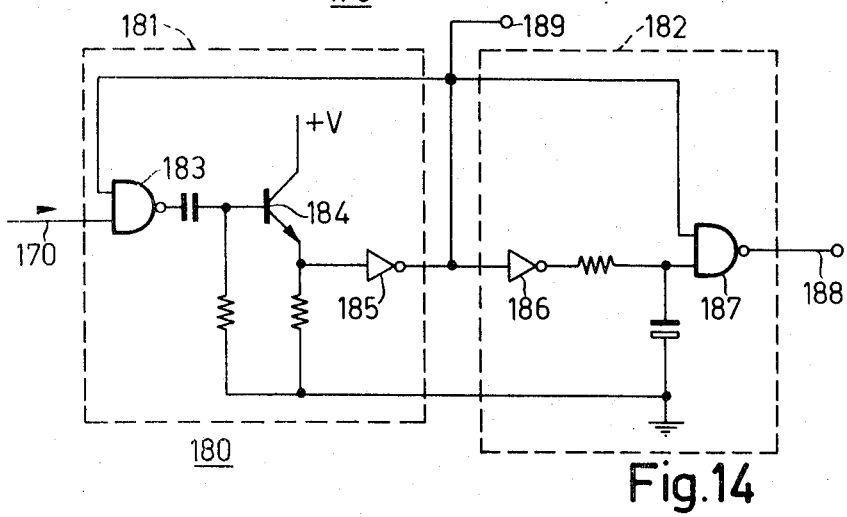
Figure 15:
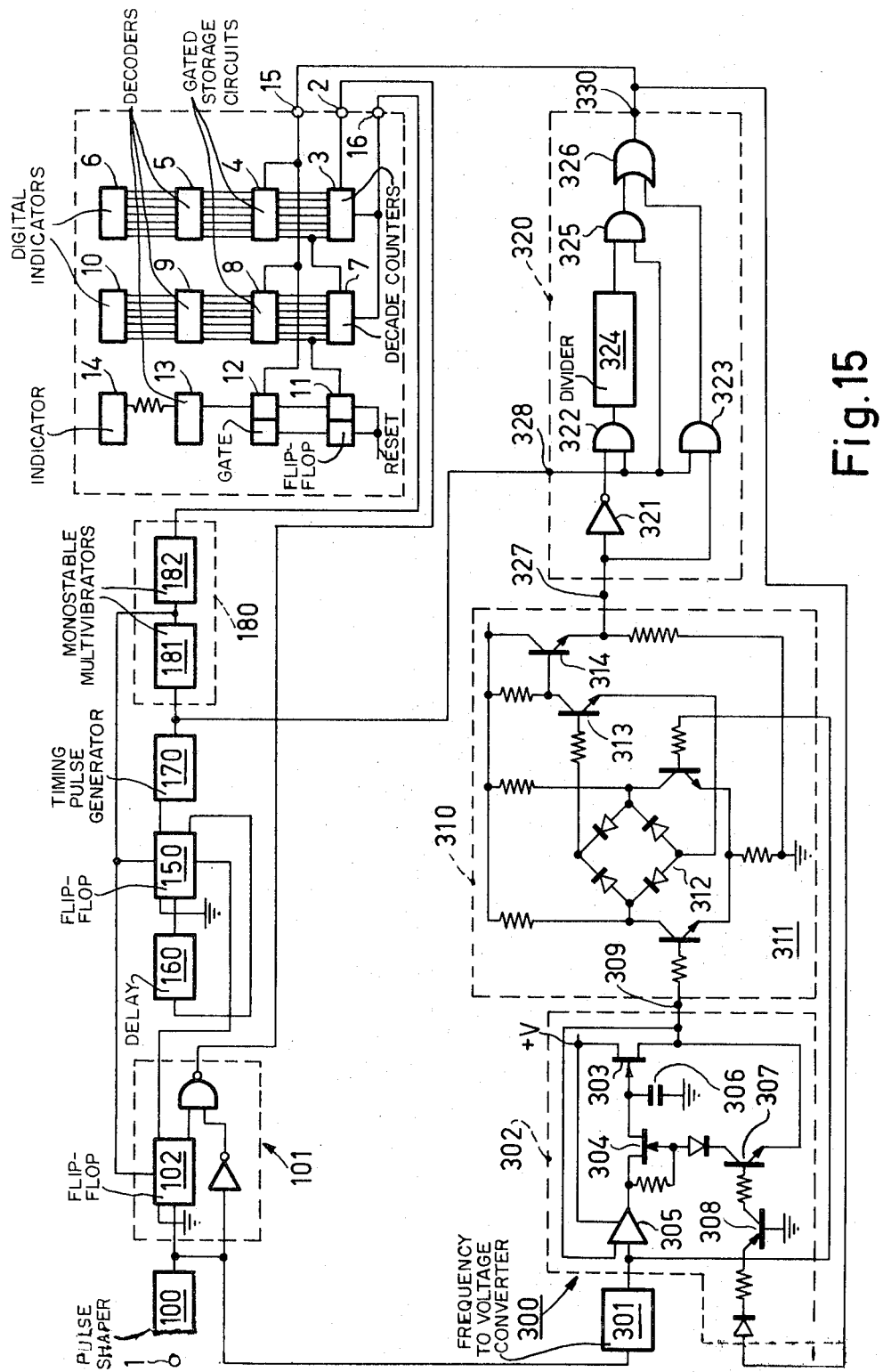

FIGS. 11, 12, 13 and 14 are circuit diagrams of parts of the apparatus of FIG. 7 which in some instances are common to the apparatus of FIG. 15.

FIG. 15 is a schematic diagram, partly in blockform and partly in detailed form in accordance with the primary aspect of the present invention and also in accordance with the secondary aspect of the present invention.

Figure 16:
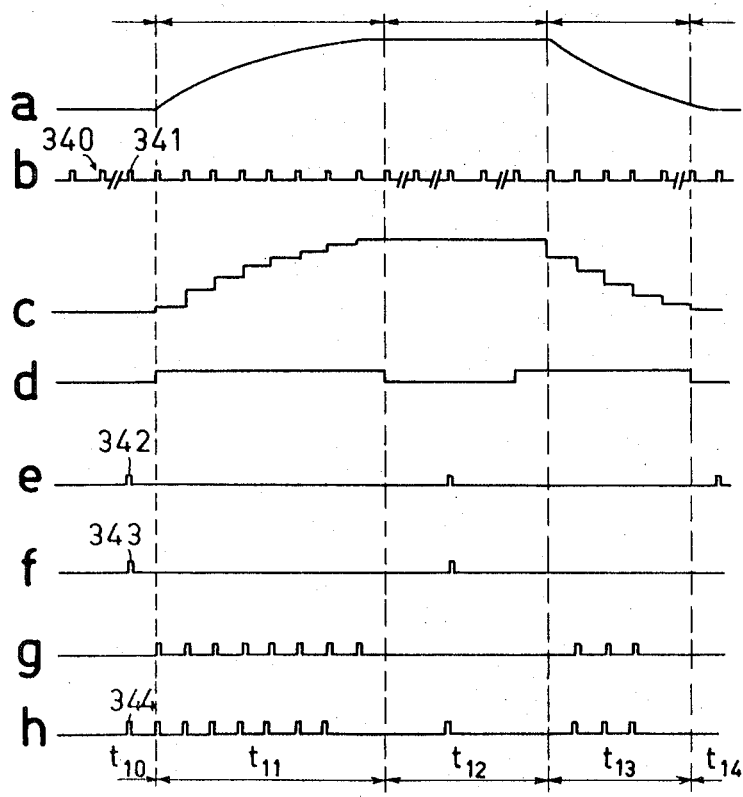

FIG. 16 diagrammatically illustrates the waveforms present at various parts of the circuit of FIG. 15 when the apparatus is in operation.

Figure 17:
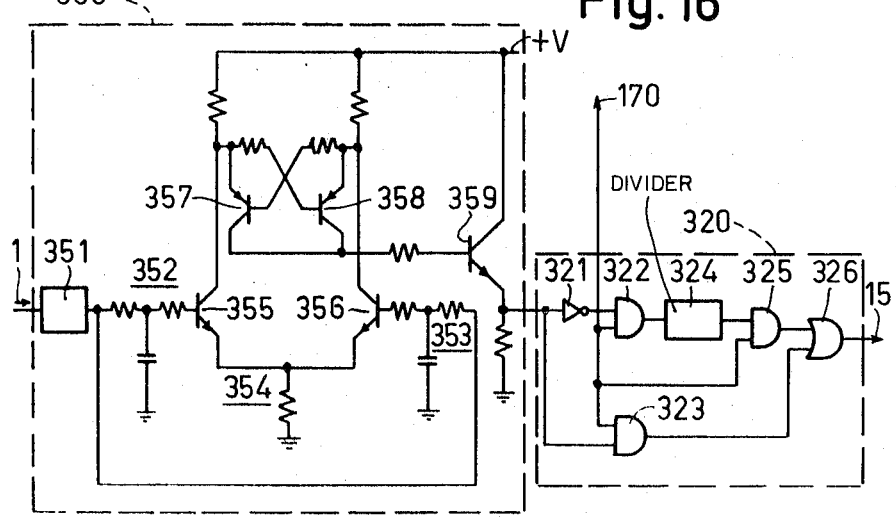

FIG. 17 is a circuit diagram of an alternative version of part of the apparatus of FIG. 15.

In the following description, the terms 'high' and 'low' may be equated to logic numbers 1 and 0 respectively, the logic value 1 representing a voltage level which is greater in magnitude than the voltage magnitude represented by the logic value 0.

Figure 1:
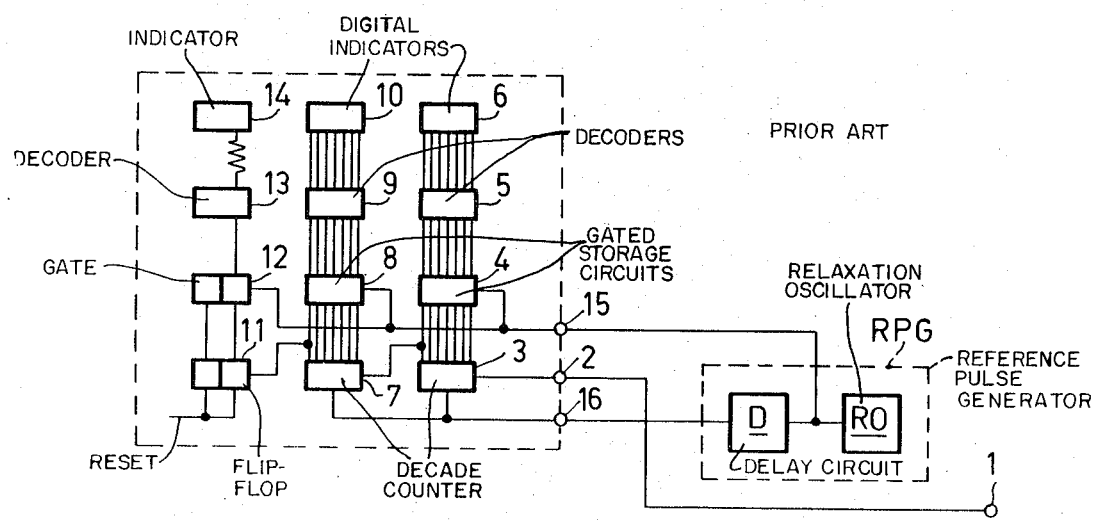
FIG. 1 is a block schematic diagram of known speed measurement and indication apparatus of the kind to which the invention relates.

In the apparatus of FIG. 1, a signal pulse train, the pulse reference frequency of which is proportional to the speed of the motor vehicle is fed to the terminal 1 from a transducer (not shown) located in the gear box of the vehicle. Via the terminal 2, the signal pulse train is fed to the B.C.D. coded decade counter 3. The B.C.D. outputs of the counter 3 are coupled via the gated storage circuit 4 and the decoder circuit 5 to the digital indicator 6. The counter 3 may, for example, be a B.C.D. decode counter Philips Type FJJ141 integrated circuit. The storage circuit 4 may, for example, be a quadruple latch D flip-flop Philips Type FJJ181 integrated circuit. The decoder circuit 5 may, for example, be a single decoder NIT DRIVER Philips Type FJL101 integrated circuit.

The BCD counter 3 is connected in cascade arrangement with the BCD counter 7 which is, in turn, connected via the gated storage circuit 8 and the decoder circuit 9 to the indicator 10, the circuit 8 and 9 and the indicator 10 being identical with the circuits 4 and 5 and the indicator 6 respectively.

The BCD counter 7 is connected in cascade arrangement with the bistable unit 11 which is, in turn, connected via the gate 12 and the decoder 13 to the indicator 14. For gating purposes the gated storage circuits 4 and 8 and the unit 12 are connected to the terminal 15. For counter re-setting purposes the counters 3 and 7 are connected to the terminal 16. Arrangements such as that constituted by the units 3 to 14 inclusive for periodically counting and displaying digital information up to 199 under the control of appropriate signals fed to the terminals 2, 15 and 16 are well known to persons skilled in the art.

A reference pulse generator RPG is constituted by a free-running relaxation oscillator RO and a delay circuit D. The oscillator RO produces a train of pulses at fixed intervals which are supplied to the terminal 15 as sampling pulses and also the delay circuit D. Accordingly, a pulse train is produced at the output of the delay circuit D having the same pulse recurrence frequency as that of the pulse train supplied to the terminal 15. The pulse train produced at the output of the delay circuit D is supplied to the terminal 16. There is a fixed time relationship between each pulse occurring at the terminal 16 and the pulse occurring at the terminal 15 preceding it in time. Since the pulses produced by the oscillator RO occur at fixed intervals, there is also a fixed time relationship between each pulse occurring at the terminal 16 and the pulse occurring at the terminal 15 following it in time.

The operation of the circuit of FIG. 1 is as follows. The counters 3 and 7 and the bistable unit 11 are periodically re-set to zero at the occurrence of each pulse at the terminal 16. The counter 3 periodically commences to count the pulses of the signal pulse train present at the terminal 1 after each re-setting. For counts in excess of 9, the counter 7 comes into operation on each 10th pulse in known manner and for counts in excess of 99, the bistable unit 11 also comes into operation and changes state at the 100th pulse in known manner. The information present in the stages of the counter 3 are continuously applied to the input of the storage circuit 4. During the presence of each sampling pulse applied to the storage circuit 4 via the terminal 15, the information present at the input of the storage circuit 4 is transferred to the storage output. There is no such transfer in the absence of a sampling pulse, however, the information present at the output of the storage circuit 4 at cessation of each sampling pulse is retained at the storage output until the occurrence of the next succeeding sampling pulse at the terminal 15. The information at the output of the storage circuit 4 is decoded by the decoder 5 and supplied to the digital indicator 6.

The operation of the storage circuit 8 and the decoder 9 is similar to that of the storage circuit 4 and the decoder 5 for transferring information present in the stages of the counter 7 to the indicator 10. Likewise, the operation of the gate 12 and the decoder 13 is similar for transferring information from the bistable unit 11 to the indicator 14 except that, in this case, only the presence or absence of the digit 1 is required to be indicated and a more simplified circuit is employed.

The time interval between the leading edge of the re-setting pulses applied to the terminal 16 and the leading edge of the sampling pulse subsequent in time thereto is of fixed duration and provides a measurement interval during which the pulses of the signal pulse train supplied from the terminal 1 are counted by the counters 3 and 7 and the bistable unit 11 so that the digits reproduced at the indicators 6, 10 and 14 from the information present at the counters 3 and 7 and the bistable unit 11 show a count representing the number of pulses of the signal pulse train spanned by the measurement interval. Employed as a speedometer in a motor vehicle, the measurement interval is so chosen that each pulse of the signal pulse train occurring within the measurement interval represents 1 m.p.h.

The apparatus of FIG. 1 suffers from the aforementioned first and second serious drawbacks.

Figure 2:
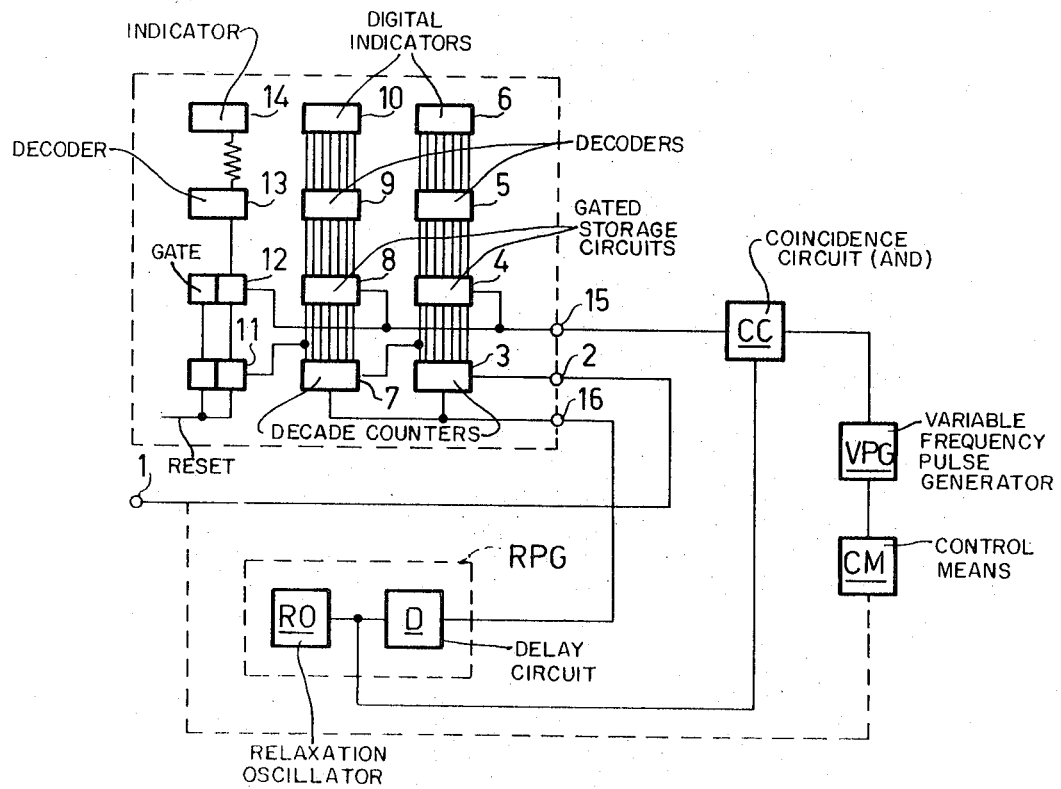
FIG. 2 is a block schematic diagram of known speed measurement and indication apparatus in accordance with a primary aspect of the present invention.

In FIG. 2, certain parts are identical with corresponding parts in FIG. 1 and like parts are denoted by like numerals or letters.

In the apparatus of FIG. 2, sampling pulses are not supplied directly from the relaxation oscillator RO to the terminal 15 as in the apparatus of FIG. 1. Instead, sampling pulses are derived from the relaxation oscillator RO via the coincidence circuit CC.

The coincidence circuit CC is also supplied with pulses of fixed duration from a variable frequency pulse generator VPG. The frequency of the generator VPG is controlled by a control means CM which is sensitive to the rate of change of the speed being measured. The frequency of the generator VPG is controlled in such a manner that when the speed being measured is constant, frequency of the pulse generator VPG is constant also but when the speed being measured is changing the frequency of the pulse generator VPG increases in accordance with the rate of change of speed. The coincidence circuit CC permits only those pulses from the reference pulse generator RPG which coincide in time with a pulse from the variable frequency pulse generator VPG to reach the terminal 15 but since the duration of each pulse produced by the generator VPG is substantially equal to the period of the relaxation oscillator RO, a sampling pulse will be produced at the terminal 15 for every pulse from the genenator VPG. Under such conditions, the recurrence rate of the sampling pulses produced at the terminal 15 is increased or decreased substantially continuously with increase or decrease of the rate of change of the speed being measured. Accordingly, the transfer of counter information from the input to the output of the storage circuits 4, 8 and 12 is updated more rapidly during accelleration or decelleration than during a constant speed and by suitable design of the variable frequency pulse generator VPG and the control means CM, the aforementioned first serious drawback may be overcome.

Conveniently, the control means CM may be in the form of a converter to which the signal pulse train from the terminal 1 is supplied, the converter supplying a zero control voltage to the generator VPG when the pulse recurrence frequency of the signal pulse train is constant and supplying a positive control voltage in response to a change of the recurrence frequency of the signal pulse train, the magnitude of the positive voltage being related to the rate of change of the recurrence frequency of the signal pulse train. The frequency of the variable frequency pulse generator VPG is constant when a zero control voltage is supplied from the control means CM but increases when the control voltage is positive, the increase in frequency being related to the magnitude of the positive control voltage. It will be appreciated that other means than that described above are possible for producing a zero control voltage when the speed is constant and a positive control voltage when the speed is changing.

In FIG. 3, certain parts are again identical with corresponding parts in FIG. 1 and, again, like parts are denoted by like numerals or letters.

Figure 3:
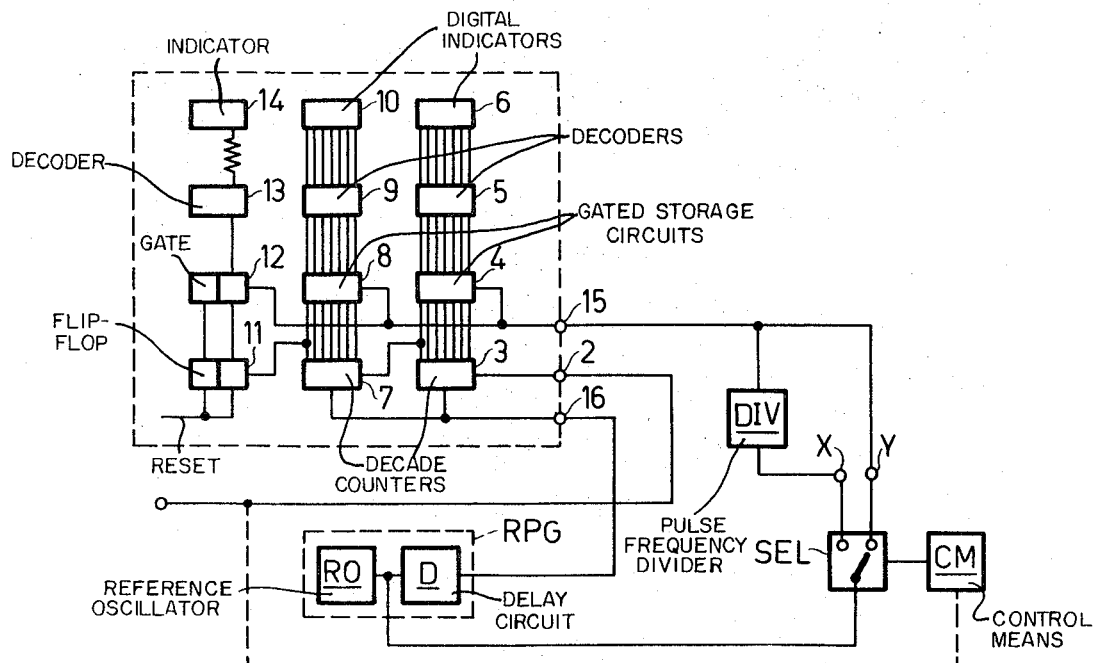
FIG. 3 is a block schematic diagram of another speed measurement and indication apparatus in accordance with the primary aspect of the present invention.

In the apparatus of FIG. 3, sampling pulses are not always applied directly from the relaxation oscillator RO to the terminal 15 as in the apparatus of FIG. 1. Instead, the pulses present at the output of the oscillator RO are supplied to the input of a selection circuit SEL having two output terminals. The selection circuit SEL is controlled by the control means CM, which is sensitive to the rate of change of the speed being measured, in such a manner that when the speed being measured is relatively constant the input of the selection circuit SEL is supplied to the output terminal X whereas when the speed being measured is changing at a rate in excess of a predetermined rate, the input of the selection circuit SEL is supplied to the output terminal Y. Conveniently, the control means CM may take the form of a converter as described in relation to FIG. 2 whereby a zero control voltage is supplied to the selection circuit SEL when the speed is constant and a positive voltage, the magnitude of which is related to the rate of change of the speed being measured, is supplied in response to a change of speed. The selection circuit SEL may be so arranged that with a zero control voltage supplied from the control means CM, the input is supplied to the output terminal X whereas when the control voltage is positive and in excess of a predetermined magnitude, the input is supplied to the output terminal Y.

The output terminal Y is connected directly to the terminal 15 whereas the terminal X is connected to the terminal 15 via a pulse frequency divider DIV which divides the frequency of a pulse train present at the terminal X by a certain factor. At a constant speed, the pulse train produced at the output of the oscillator RO is supplied to the terminal 15 via the divider DIV and produces sampling pulses recurring at a frequency which is a sub-multiple of the frequency of the pulse train produced at the output of the oscillator RO. On the other hand, when the speed is changing, the pulse train produced by the oscillator RO is supplied directly to the terminal 15 via the selection circuit SEL and the output terminal Y so that the recurrence rate of the sampling pulses is that of the pulse train produced by the oscillator RO Accordingly, the transfer of counter information from the input to the output of the storage circuits 4, 8 and 12 is updated more rapidly during accelleration or decelleration than during a constant speed and by suitable choice of the division ratio of the divider DIV and the magnitude of the control voltage at which the selection circuit SEL responds to the control means CM, the aforementioned first serious drawback may be overcome.

In FIG. 4, again, certain parts are identical with FIG. 1 and, again, like parts are denoted by like numerals or letters.

In the apparatus of FIG. 4, although the output of the relaxation oscillator RO is directly connected to the terminal 15 and the output of the delay circuit D is directly connected to the terminal 16, the input terminal 1 of the apparatus, to which is supplied the signal pulse train is connected via a gating circuit G to the terminal 2. The gating circuit G permits the signal pulse train to be supplied to the terminal 2 only when the gating circuit is "opened" by the control line L being in the "low" state. In addition, the relaxation oscillator RO is not a freely running device. The relaxation oscillator RO is associated with a suppression circuit S which inhibits the operation of the oscillator RO when the control line L is in the "high" state. When the state of the control line L changes from "high" to "low," the inhibition provided by the suppression circuit S is lifted and a cycle of oscillation of the oscillator RO is commenced. Accordingly, after a period of time determined by the natural period of oscillation of the oscillator RO the oscillator RO produces a pulse which is supplied as a sampling pulse to the terminal 15 and after a further period of time determined by the characteristics of the delay circuit D, the delay circuit D produces a pulse which is supplied to the terminal 16 re-setting the counters 3 and 7 and the unit 11 to zero and is also supplied to the re-set terminal R of the flip-flop FF. The flip-flop FF is a D-type flip-flop of well known type, the operation of which is well known to persons skilled in the art. Briefly, whenever the flip-flop FF is set by the application of a pulse of appropriate polarity and magnitude to the terminal R, the flip-flop FF is "set" so that the output terminal Q is in the high state. The D input terminal D of the flip-flop FF is connected to ground potential. Whenever a pulse of appropriate polarity and magnitude is applied to the input terminal T of the flip-flop FF, the state existing at the "D" input D, in this case low, is transferred to the output terminal Q.

The operation of the circuit of FIG. 4 is as follows. Assuming that the counters 3 and 7 and the unit 11 have been set to zero and assuming also that the flip-flop FF has also been set so that the control line L is in the high state the gate G will be closed and the oscillator RO will be inhibited by the suppression circuit S. If now a signal pulse train is applied to the terminal 1, the first pulse of the signal train triggers the flip-flop FF so that the low at terminal D is transferred to the output terminal Q causing the control line L to become low opening the gate G and permitting the signal pulse train to be supplied to the terminal 2 so that they are counted by the counters 3 and 7 and the unit 11. Simultaneously, since the control line L is low, a cycle of operation of the oscillator RO is initiated and, at a fixed interval after the flip-flop FF has been triggered by the first pulse of the signal pulse train, a sampling pulse is produced at the terminal 15 so that during the presence of the sampling pulse the counting information present at the input of the storage circuits 4, 8 and 12 is transferred to the storage output and at cessation of the sampling pulse is retained as the output of the storage circuits 4, 8 and 12 respectively until the next sampling pulse at the terminal 15. The information at the output of the storage circuit 4, 8 and 12 is decoded by the decoders 5, 9 and 13 respectively and supplied to the digital indicators 6, 10 and 14 respectively.

At a further fixed interval after the sampling pulse, a pulse is produced at the output of the delay circuit D which is fed to the terminal 16 re-setting the counter to zero and which is also fed to the flip-flop FF setting the flip-flop FF again so that the control line L goes high inhibiting the oscillator RO and closing the gate G. Upon arrival of the next succeeding pulse of the signal pulse train, the flip-flop FF is triggered once more and the process is repeated.

In the absence of the gate G, the counter 3 could be reset to zero sufficiently in advance of the commencement of the next cycle of the oscillator RO for an erroneous count to result from one or more pulses of the signal pulse train reaching the counter 3 after re-set of the counter and prior to commencement of the next cycle.

It will be evident, that if desired, a further delay circuit may be provided between the output of the delay circuit D and the set terminal R of the flip-flop FF.

Referring now to FIG. 5 which is a circuit diagram of apparatus basically similar to that of FIG. 2, again like parts are denoted by like numerals or letters.

A constant frequency oscillator of known kind generally denoted by the numeral 20 and constituted by the silicon controlled rectifier device 21, the capacitance 22 and the resistances 23, 24, 25 and 26 connected as illustrated and connected between the positive supply line 27 and the earth line 28 produces a constant frequency reference pulse train at the point H having a wave form substantially as illustrated by the wave form H of FIG. 6. The time interval $t1$ between the leading edges of consecutive pulses 50 of the wave form H is 100 m sec. The oscillator 20 also produces a constant frequency reference pulse train at the point A with a pulse recurrence frequency the same as that of the wave form H but in which the pulses are inverted, that is, negative going. The pulse train at point A is fed via the delay network of known kind comprising the gates G1, G2, G3 and G4, the capacitances 29 and 32 and the resistances 30 and 31 and via the inverter G5 to the point F which is connected to the terminal 16. The pulse train produced at the point F has a wave form somewhat as illustrated by the wave form F of FIG. 6. Accordingly, the time interval $t2$ between the leading edges of the pulses 51 of the wave form F is also 100 m sec. There is, of course, a fixed time delay between each pulse 51 of the wave form F and a related pulse 50 of the wave form H.

The pulse output of a variable frequency oscillator 33 is fed to the monostable multivibrator 34 which produces an output having a fixed width of 100 m sec. for every input pulse applied thereto. The output pulses of the multivibrator 34 are fed to one of the input of the and gate G6 and the frequency of the oscillator 33 is controlled by a control voltage supplied from the converter 35 to which is supplied the signal pulse train present at the terminal 1. The converter 35 is sensitive to the rate of change of the pulse recurrence frequency of the input signal pulse train. When the pulse recurrence frequency of the signal pulse train is constant, the control voltage produced by the converter 35 is at zero. However, a change in the pulse recurrence frequency of the signal pulse train in either direction produces a positive control voltage, the magnitude of which is proportional to the rate of change. The adjustable resistance 36 provides a sensitivity control for the converter 35. By means of the resistance 36 the output voltage of the converter 35 can be adjusted for a given rate of change of the pulse recurrence frequency of the signal pulse train. Accordingly, the frequency of the oscillator 33 is increased whenever there is a change in the pulse recurrence frequency of the signal pulse train, the increase being related to the rate of change of the pulse recurrence frequency. The output wave form for the multivibrator 34 is substantial as illustrated by the wave form M of FIG. 6, each of the pulses 52 having a duration of 100 m sec. and the output wave form of the gate G6 is somewhat as illustrated by the wave form K of FIG. 6, each of the pulses 53 being coincident in time with a pulse 50 of the wave form H from which it is derived.

The operation of the circuit of FIG. 5 is as follows. The counters 3 and 7 and the bistable unit 11 are periodically re-set to zero at the occurrence of each pulse 51 of the wave form F and the counter 3 periodically commences to count the pulses of the signal pulse train present at the terminal 1 after each re-setting pulse applied thereto. For counts in excess of 9, the counter 7 comes into operation on each 10th pulse in known manner and for counts in excess of 99, the bistable unit 11 also comes into operation and changes state at the 100th pulse in known manner. The information present in the stages of the counter 3 are continuously applied to the input of the storage circuit 4. During the presence of each sampling pulse 53 of the wave form K applied to the storage circuit 4 via the terminal 15, the information present at the input of the storage circuit 4 is transferred to the storage output. There is no such transfer in the absence of a sampling pulse 53, however, the information present at the output of the storage circuit 4 at cessation of each sampling pulse 53 is retained at the storage output until the occurrence of the next succeeding sampling pulse 53. The information at the output of the storage circuit 4 is decoded by the decoder 5 and supplied to the digital indicator 6.

The operation of the storage circuit 8 and the decoder 9 is similar to that of the storage circuit 4 and the decoder 5 for transferring information present in the stages of the counter 7 to the indicator 10. Likewise, the operation of the gate 12 and the decoder 13 is similar for transferring information from the bistable unit 11 to the indicator 14 except that, in this case, only the presence or absence of the digit 1 is required to be indicated and a more simplified circuit is employed.

The time interval between the leading edge of the re-setting pulses 51 of the wave form F applied to the terminal 16 and the leading edge of the pulse 50 of the wave form H subsequent in time is such that each pulse of the signal pulse train occurring at the terminal 2 represents 1 mile per hour. The sampling pulses 53 of the wave form K are, of course, respectively coincident in time with a corresponding pulse 50 of the wave form H. Accordingly, each sampling pulse 53 occurring at the terminal 15 is always related in time with the previously occurring re-set pulse 51 so that the digits reproduced at the indicators 6, 10 and 14 from the information present in the counters 3 and 7 and the bistable unit 11 show a count representing the speed of the vehicle in miles per hour for the time interval in question.

As is evident from a comparison of the wave form F and the wave form K of FIG. 6, every re-setting pulse 51 of the wave form F is not followed by a sampling pulse 53. A sampling pulse 53 is only produced at the terminal 15 when a pulse 50 coincides with the duration of a pulse 52 from the multivibrator 34. The oscillator 33 is so proportioned that with a zero control voltage from the output of the converter 35, the pulses 52 occur at about every 30 seconds. Since the duration of each pulse 52 is 100 m sec., its duration will coincide in time with a particular pulse 50 and accordingly a sampling pulse 53 will be produced at the terminal 15. It follows that under such conditions, the transfer of counter information from the input to the output of the storage circuits 4, 8 and gate 12 is updated every 30 seconds. However, a zero control voltage from the converter 35 is produced only when the speed of the vehicle is constant. An increase or decrease of speed of the vehicle results in a positive control voltage being supplied to the oscillator 33 thereby increasing the frequency of the oscillator whereupon the pulse recurrence frequency of the pulses 52 of the wave form M is increased with a corresponding increase of the pulse repetition frequency of the sampling pulses 53 applied to the terminal 15 resulting in shorter intervals between updating of transfer of information from the input to the output of the storage circuits 4, 8 and 12 during such increase or decrease of the speed of the vehicle. The shortest attainable period between sampling pulses, with maximum accelleration of the vehicle, is 100 m sec. The choice of such a period is due to the fact that the human eye loses its ability to resolve individual images at a rate of change above 10 images per second. The re-setting pulses 51 are delayed with respect to the pulses 50 to ensure that counter information is not erased before storage in the respective storage circuits 4, 8 or 12.

In FIG. 6, the time interval $t3$ indicates an interval of time during which the speed of the vehicle is constant, $t4$ indicates an interval of time during which the vehicle is accellerating, $t5$ indicates an interval of time during which the vehicle is decellerating and $t6$ indicates a further interval of time during which the vehicle speed is constant.

The converter 35 may be of a known kind and may, for instance, comprise a frequency to voltage converter producing a variable direct voltage the magnitude of which is proportional to the pulse recurrence frequency of the signal pulse train from the terminal 1, the variable direct voltage being applied via separate delay circuits to separate inputs of a twin-input difference amplifier supplying a rectifier bridge so that if the input voltages of the difference amplifier are unlike the bridge produces a positive voltage of magnitude related to the difference between the input voltages of the difference amplifier and produces a zero output when the input voltages of the difference amplifier are alike. The delay circuits have different time constants so that when there is a change in magnitude of the variable direct voltage from the frequency to voltage converter the voltage reaching one input of the difference amplifier follows the change more rapidly than does the voltage reaching the other input thus the bridge produces a positive voltage output regardless of whether the direction of change of the variable direct voltage from the frequency to voltage converter is positive-going or negative-going. However, with no change of magnitude of the variable direct voltage the input voltages to the difference amplifier are alike and the bridge produces a zero output.

The advantages of the apparatus of FIG. 5 when installed in a motor vehicle will be apparent. An indication of speed is provided approximately every 30 seconds when the speed of the vehicle is constant but the indicated speed is updated more frequently during periods of accelleration or decelleration.

Referring now to FIG. 7, and FIGS. 8 to 14 associated therewith, in which again like parts are denoted by like numerals or letters.

The apparatus of FIG. 7 is basically similar to the apparatus described in relation to FIG. 4 although additional parts have been included and changes made for reasons which will be evident to persons skilled in the art.

In order to provide synchronized counting the speed measurement and indication apparatus of FIG. 7 comprises a pulse shaper 100 the input of which forms the input for the apparatus, coupled to a pulse gating and count pulse gating network 101. The purpose of the pulse shaper 100 is to provide an input pulse train for the network 101 which is free of interference and comprises pulses of uniform magnitude.

The pulse shaper 100 is in the form of a dual pulse-width discriminator illustrated in FIG. 9 and which discriminator ensures that fast rise time spikes superimposed on incoming pulses of the input signal pulse train are attenuated. It further eliminates any unwanted spikes that may occur between adjacent pulses of the input signal pulse train.

In the initial state of the dual pulse width discriminator of FIG. 9 when the voltage at the input terminal 1 is low, that is, in the absence of any input signal pulse, the voltage at the output 122 of the discriminator is also low. In this state, the various input and output terminal of the gates comprising the discriminator are either high or low, as will be apparent to those skilled in the art.

FIG. 10 depicts the wave forms present at various parts of the circuit of FIG. 9 during operation when an input signal is applied to the terminal. Each wave form depicted being denoted by a numeral or letter related to the part concerned.

Referring to FIGS. 9 and 10 collectively, each input signal pulse 123 applied to terminal 1 of the discriminator will cause capacitance 124 to charge through resistance 125 towards the supply voltage V. If the pulse width of each of the input signal pulses 123 is sufficiently large, the charge acquired by capacitance 124 will reach the threshold switching voltage of the inverter stage 126. Consequently, the set line S of the latch arrangement 127 is pulled low causing the latch 127 to change state. Upon such change of state, feedback from the NAND gate 128 of the latch to that input of the NAND gate 129 connected to the inverter stage 126 returns that input to logic 1.

With the latch in this condition the input terminal 1, as will be apparent, is isolated from the network controlling the set line S and is gated to the network controlling the re-set line R.

When in the high state, the output 122 of the discriminator will not go low until a period determined by the capacitance 130 and resistance 131 after the voltage at an input of the discriminator goes low, that is, after cessation of an input pulse. As will be evident from the wave forms of FIG. 10, the discriminator will not respond to input signal pulses having a pulse width less than the time interval tx and occurring with a period of less than (td-tx).

Figure 11:
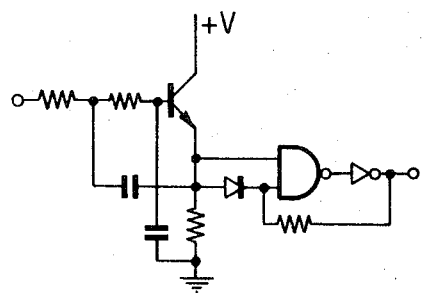

As an alternative, the dual pulse-width discriminator of FIG. 9 may be replaced, if desired, by the combination of a double element input filter followed by a Schmitt trigger as is illustrated in FIG. 11.

The double element input filter provides for filtering of the input signal to remove all interference present. In a practical situation, the use of such a filter eliminates the need of filtering components which would normally form part of the transducer hereinbefore referred to. The Schmitt trigger functions as a pulse shaper to prevent spurious output pulses being generated should the input voltage be slowly varying.

The output of the pulse shaper 100 is coupled to a pulse gating and count pulse gating network 101. A D-type flip-flop 102 provides the pulse gating section of the network and is arranged in such a manner that in an initial state, that is, the absence of an input signal train after the flip-flop 102 has been set, terminal 103 is low, terminals 104 and 105 are high and low respectively, terminal 106 is high and the D terminal 107 is low, in this instance being connected to ground.

The leading edge of a pulse applied to terminal 103 triggers the flip-flop 102 and causes the low state present on terminal 107 to be transferred to terminal 104 while simultaneously rendering terminal 105 high. Second and subsequent pulses applied to terminal 107 do not effect any further changes in the state of the flip-flop 102 while terminal 104 is still low. Whereas, low applied to terminal 106 of the flip-flop 102 sets the flip-flop 102 to its initial state whereupon the leading edge of the next input pulse occurring after the applied low retriggers the flip-flop 102.

The count pulse gating section of the network 101 is provided by a NAND gate 108 having one input connected to terminal 105 and the other input terminal connected via an inverter 109, to terminal 103 of the flip-flop 102. Thus, in the initial state, the flip-flop 102 hereinbefore described renders the output of the NAND gate 108 high.

An input pulse applied to terminal 103 of the flip-flop which renders terminal 104 low and terminal 105 high produces a low at the output of the "NAND" gate 108 on the trailing edge of that pulse. The next input pulse at terminal 103 of the flip-flop 102 while not affecting the state of the flip-flop 102 produces a corresponding pulse at the output of the NAND gate 108.

As will be apparent, pulses are only produced at the output of the NAND gate 108 when terminal 105 of the flip-flop 102 is high. The application of a low to terminal 106 of the flip-flop 102 which turns terminal 105 low, inhibits the production of further pulses at the output of the NAND gate 108.

The NAND gate 108 output is coupled via the terminal 2 to the BCD decode counter of the BCD decode counter and display unit, which unit is identical to that described hereinbefore with reference to FIG. 1.

A second D-type flip-flop 150 has terminal 151 connected to terminal 104 of the flip-flop 102 of the pulse gating section of the previous stage 101. In the intial state of the flip-flop 150, when terminal 151 is high, terminals 152 and 153 are high and low respectively, terminal 154 is high and terminal 155 is low, in this instance being connected to ground.

The flip-flop 150 operates in the same manner as the flip-flop 102 of the pulse gating section of the previous stage 101. A low applied to terminal 151 re-sets the flip-flop 150 so that a low is present at the terminal 152 while a low applied to terminal 154 sets the flip-flop 150 to its initial state with terminal 152 high whereby the next low occurring at terminal 151 after the setting of the flip-flop 150 causes it to change state again.

Figure 12:
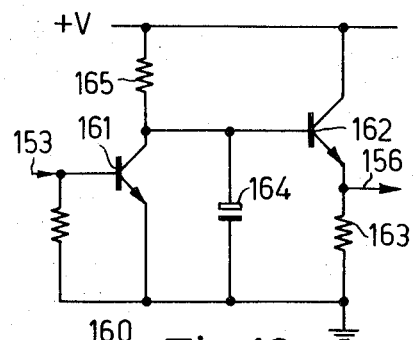

Terminal 153 of the flip-flop 150 is coupled to a delay unit 160 of the form illustrated in FIG. 12. In the initial state of the flip-flop 150 when terminal 153 is low, transistor 161 of the unit 160 is arranged to be "off" and transistor 162 is arranged to be on. Since the output of delay unit 160 is obtained from across the emitter resistance 163 of transistor 162 and which output is connected to terminal 156 of the flip-flop 150, terminal 156 of the flip-flop 150 is initially high.

When the flip-flop 150 is triggered by a low at terminal 151 and terminal 153 goes high, transistor 161 of the delay unit 160 is switched "on" and accordingly transistor 162 is switched off. In this condition the capacitance 164 of the delay unit 160 is virtually short-circuited and the output of the delay unit 160 is low.

The low applied to terminal 154 of the flip-flop 150 which sets terminal 153 to its original low state results in transistor 161 of the delay unit 160 being switched off. Transistor 162 of the delay unit will not be switched on until capacitance 164 is charged through resistance 165 to a predetermined voltage value to render transistor 162 on.

When capacitance 164 acquires the voltage sufficient to render transistor 162 conductive, the output of the delay unit 160 goes high. The high thus produced is fed to terminal 156 of the flip-flop 150 and triggers that flip-flop 150 to cause a change of state, that is, terminal 152 to go low and terminal 153 to go high. When this occurs, the high produced at terminal 153 inhibits the delay unit 160 in the manner described above until flip-flop 150 changes state again to produce a low at terminal 153 thereof.

Terminal 152 of the flip-flop 150 is connected to an interval generator 170 arranged for operation such that the presence of a high at its input renders the generator 170 non-operative while the presence of a low at its input renders it operative. The generator 170 in the operative state produces timing pulses, the period between adjacent timing pulses being relatively large, for example, in the order of 200 m sec.

The generator 170 is as illustrated in FIG. 13 and comprises a simple relaxation oscillator formed by a silicon controlled switch 171 and its associated circuitry. The anode electrode of the silicon controlled switch 171 is held at the saturation voltage of transistor 172 when the base electrode thereof is high. Once the base electrode of the transistor 172 goes low the relaxation generator functions in known manner, to produce a timing pulse at the end of each cycle of operation the oscillator output being derived from the cathode of the silicon controlled switch 171.

The output of the interval generator 170 is coupled to each of the storage elements 4, 8 and 12 of the BCD decode counter and indicator unit via the terminal 16, each timing pulse generated by the interval generator 170 being used to effect transfer of information from the output of each of the BCD decode counters 3, 7 and 11 to the outputs of their respective stores 4, 8 and 12, as described in relation to FIG. 1.

The output of the interval generator 170 is also coupled via an inverter stage (not shown) included for polarity purposes to the input of a double delay unit 180, which unit produces in response to a pulse applied at its input a first timing pulse after a first delay and a second timing pulse after a second delay. The first timing pulses being used for setting each of the flip-flops 102 and 150 as hereinbefore described to their initial states and the second timing pulse being used for re-setting the BCD decode counters 3 and 7 of the BCD decode counter and display unit to zero.

The double delay unit 180 is of the form illustrated in FIG. 14 comprising two cascaded monostable multivibrators 181 and 182. The output of the NAND gate 183 of the first monostable multivibrator 181 is coupled by transistor 184 connected as an emitter follower and serving to act as a buffer to the inverter stage 185. The output of the inverter 185 is coupled to the inverter stage 186, that is the input of the second monostable 182 which is in turn coupled to one input of a NAND gate 187.

The output 188 of double delay unit 180 is coupled via an inverter stage (not shown) used for polarity purposes, to the re-set terminal of the BCD decade counters 3 and 7 in the BCD decade counter and display unit. The output of the inverter stage 185 is also coupled to the other input terminal of the NAND gates 183 and 187 of the two monostable multivibrators 181 and 182 respectively as well as being coupled to the output terminal 189 and to the set terminals 106 and 154 of the flip-flops 102 and 150 respectively.

Operation of the double delay unit 180 is as follows. In the initial state of the double delay unit 180 the output is low and the two input terminals of the NAND gate 183 of the first monostable multivibrator 181 are high. Application of a pulse to the input of the double delay unit 180 produces, as will be apparent to those skilled in the art, a negative going pulse at the output of the first monostable multivibrator, the leading edge of this pulse coinciding with that of the pulse applied to the input thereof. This negative going pulse as applied to the second monostable multivibrator 182 produces at the output 188 of the delay unit 180 a negative pulse of predetermined width, the leading edge of this pulse coinciding with the trailing edge of the negative going pulse. The monostable multivibrators 181 and 182 are so arranged that the pulse width of the pulse produced at the output terminal 189 by the first monostable multivibrator 181 is greater than the pulse with of the pulse produced at the output terminal 188 by the second multivibrator 182.

Operation of the embodiment of FIG. 7 will now be described with reference to the wave forms illustrated in FIG. 8.

An input signal pulse train the pulse recurrence frequency of which is proportional to the speed is derived from a transducer (not shown) suitably located in the vehicle transmission system and is fed to the input terminal of the pulse shaper 100. The pulse shaper 100 acts in the manner hereinbefore described to eliminate spikes and other interference present in the pulse train to produce a signal pulse train as illustrated in FIG. 8a.

The output of the pulse shaper 100 is fed to the input of the pulse gating and count pulse gating network 101. The first pulse 200 of the pulse train illustrated in FIG. 8a triggers the flip-flop 102 of the gating network 101 on its leading edge to produce a low at terminal 104 and a high at terminal 105, that is, a high at one input of the NAND gate 105 of the count pulse gating section of the network 101.

The trailing edge of the pulse 200 is fed via the inverter 109 to the other input of the NAND gate 108 and produces a low at the output thereof. Further pulses of the signal pulse train applied to the pulse gating and count pulse gating network 101 while not effecting the state of the flip-flop 102, produce count pulses at the output of the NAND gate 108 as illustrated in FIG. 8e. The count pulses thus produced are fed to BCD counters 3 and 7 of the BCD decade counter and display unit.

Pulses for driving an odometer stage for mileage indication may be obtained, depending upon design requirements, from either the input or the output of the inverter 109 of the pulse gating and count pulse gating network.

The low produced at the terminal 104 of the flip-flop 102 and fed to terminal 151 of the flip-flop 150 produces a low and high respectively at terminals 152 and 153 thereof. The high at terminal 153 is supplied to the delay unit 160 and renders the output thereof low and hence renders terminal t2 of the flip-flop low.

The low produced at terminal 152 of the flip-flop 150 is fed to the interval generator 170 to render that generator operative such that after a period determined by the generator characteristics, a timing pulse 201 as illustrated in FIG. 8(i) is produced at the output thereof. The timing pulse 201 is fed to each of the storage elements 4, 8 and 12 of the BCD decade counter and display unit, causing transfer of information present on each of the input terminals of the respective output terminals thereof whereby said information is displayed on the display device, the stores 4, 8 and 12 being latched at the end of the timing pulse 201.

The timing pulse 201 is also fed to the double delay unit 180 to produce negative going pulses 202 and 203 at the outputs 189 and 188 of the delay stages 181 and 182 respectively as illustrated in FIGS. 8j and 8k. The first negative going pulse 202 sets each of the flip-flops 102 and 150 to their initial conditions and inhibits operation of the count pulse gating section of the network 101 and of the interval generator 170.

The next input signal pulse 204 as illustrated in FIG. 8 a subsequent to the setting of the flip-flops 182 and 150 retriggers the apparatus for further operation.

During the period when the terminal 153 of the flip-flop 150 is in the low state, represented by the pulse 205 of FIG. 8 g, the collector potential of transistor 161 of the delay unit 160 is high for the same period as illustrated in FIG. 8 m. Accordingly, as this period is of short duration the capacitor 164 never acquires a potential sufficient to switch transistor 162 on and provide a low at the output of the delay unit 160.

When the vehicle speed reduces to a low level such that the period between consecutive input signal pulses is large, the collector potential of transistor 161 remains high for a considerable period. This period is terminated when the charge on capacitance 164 reaches a sufficient voltage level to switch transistor 162 on, and thus producing a high at the output of the delay unit 160. The high thus produced and fed to terminal 156 of the flip-flop 150 produces a low and high at terminals 152 and 153 respectively. The high at terminal 153 switches transistor 161 of the delay unit 160 on, which transistor 161 in turn effectively short-circuits the capacitance 164 and switches transistor 162 off. The high at the output of the delay unit 160 is thus returned to the low level.

The low at terminal 152 of the flip-flop renders the interval generator 170 operative. After a period determined by the generator characteristics, a timing pulse 206 as illustrated in FIG. 8i is produced at the output thereof. This pulse as applied to each of the storage elements 4, 8 and 12 of the BCD decade counter and display unit and to the double delay unit 180 to re-set the apparatus in the manner hereinbefore described.

Terminal 153 of the flip-flop 150 is again set to a low value, and accordingly capacitance 164 of the delay unit 160 commences to charge towards the collector voltage of transistor 161. If no further input signal pulses are received before the charge on capacitance 164 reaches a value sufficient to switch transistor 162 on, the period at which the terminal 153 remains low is terminated in the manner described hereinbefore.

If the speed drops to a still lower value or alternatively the vehicle stops, the apparatus drops out of synchronization, the re-setting of the apparatus being dependant then upon the combined operation of the delay unit 160 and of the interval generator 170.

It will be apparent to those skilled in the art that the apparatus of FIG. 7 overcomes the second serious disadvantge discussed in the foregoing.

Referring now to FIG. 15 and FIG. 16 associated therewith in which, again, like parts are denoted by like numerals or letters.

The apparatus of FIG. 15 is a combination of the basic system described in relation to FIG. 3 and the basic system described in relation to FIG. 4.

Accordingly, the significant difference between the apparatus of FIG. 15 and that of FIG. 7 is the inclusion of the unit 300 which produces, according to the rate of change of speed of the vehicle either sampling pulses recurring at relatively long intervals or sampling pulses recurring at relatively short intervals.

The unit 300 is of the form as illustrated in FIG. 15. Here the unit 300 comprises a frequency-to-voltage converter 301 coupled to the output of the pulse shaper 100. The converter 301 acts in known manner, to produce a signal voltage at its output the magnitude of which is related to the pulse recurrence frequency of the input signal pulse train and is thus related to the speed of the vehicle.

The output of the converter 301 is coupled to a sample and hold circuit 302 as illustrated wherein the field-effect transistor 303 acts as a source follower and the field effect transistor 304 acts as a switch. When the transistor 304 switches ON the high open loop gain of the operational amplifier 305 ensures that the voltage at the output terminal 309 of the sample and hold circuit 302 is substantially equal to the voltge at the input. However, when transistor 304 is switched OFF, transistor 303 is isolated from the amplifier 305 and the voltage stored on capacitance 306 ensures that the output voltage of the sample and hold circuit 302 at that particular value existing immediately prior to transistor 304 being switched OFF is retained at the terminal 309.

The gate electrode of transistor 304 is coupled via transistors 307 and 308 to the output terminal 330 of the unit 300, the transistors 307 and 308 serving to allow the circuit to operate from TTL circuitry.

The output of the sample and hold circuit 302 is applied to a network 310, that is, to one input of a differential amplifier 311 forming part thereof, the other input of the differential amplifier 311 being coupled to the output of the frequency-to-voltage converter 301. The outputs of the differential amplifier are coupled to input terminals of a bridge rectifier, 312, the output terminals of which are coupled respectively to the base and emitter terminals of a transistor 313, the collector electrode of which is coupled to the base electrode of a further transistor 314.

The operation of the network 310 is such that when the two inputs to the differential amplifier 311 are equal, the transistor 313 is in the OFF state causing transistor 314 to be OFF also. The output of the network 310 taken from the emitter electrode of the transistor 314 is therefore low. However, when a difference exists between the two inputs of the differential amplifier 311 and the base emitter junction of transistor 313 is forward-biased to switch that transistor ON, transistor 314 is also switched on. Accordingly, the output of the network 310 is high.

The output of the network 310 is coupled to one input terminal 327 of a two state hold system 320, the other input terminal 328 of which is coupled to the output of the interval generator 170. The output of the hold system 320 is coupled to each of the storage elements 4, 8 and 12 of the BCD decade counter and display unit via the output terminal 230 and the terminal 15.

The two state hold system 320 as illustrated comprises an inverter 321 the input of which is connected to the input terminal 327 which is also connected to one input of an AND gate 323. The output of the inverter 321 is connected to one input of an AND gate 322. The other input terminal 328 of the system 320 is connected to the other input of the AND gate 322 and also to the other input of the AND gate 323 and to one input of an AND gate 325. The input terminal 328 is connected to the output of the interval generator 170. The output of the AND gate 322 is connected to the input of a divider 324, in this instance being a "one in 64" divider. The output of the divider 324 is connected to the other input of the AND gate 325. The output of the AND gates 323 and 325 are each connected to one input of an OR gate 326, the output of which is connected to the terminal 330.

The operation of the hold system 320 is as follows. When the input terminal 327 is high, pulses applied to the input terminal 328, as will be apparent to persons skilled in the art, are fed via the AND gate 323 and the OR gate 326 to the terminal 330. However, when the terminal 327 is low, pulses applied to the terminal 328 are fed via the divider 324. Each 64 pulse applied to the terminal 328 produces a pulse at the output of the divider 324 and at the input of the AND gate 325 connected thereto which coincides with a pulse at the other input of the AND gate 325. Accordingly pulses produced at the output of the AND gate 325 are fed to the terminal 330 via the OR gate 326.

The operation of the apparatus of FIG. 15 will now be described with reference to the voltage wave forms illustrated in FIG. 16 in which:

FIG. 16a depicts the output voltage of the converter 310 for various conditions of movement of the vehicle.

FIG. 16b illustrates the pulses produced by the interval generator 170 during the various conditions depicted in FIG. 16a.

FIG. 16c illustrates the output of the sample and hold system during these conditions.

FIG. 16d depicts the pulses produced at the output of the network 310.

FIG. 16f illustrates the pulses produced at the output of the AND gate 325.

FIG. 16g illustrates the pulses produced at the output of the AND gate 323; and

FIG. 16h illustrates the pulses produced at the output of the OR gate 326 during the various conditions of vehicle movement depicted in FIG. 16a.

When the vehicle is moving with constant speed, the pulses 340 are produced at the output of the interval generator 170 in the manner hereinbefore described with reference to the embodiment of FIG. 7. These pulses are fed both to the double delay unit 180 and to the two state hold system 320. The output of the frequency-to-voltage converter 301 under these circumstances is constant.. Accordingly, the two inputs of the differential amplifier 311 of the network 310 are substantially equal and any voltage difference present across the bridge rectifier is insufficient to switch transistor 313 on and thereby switch transistor 314 ON.

The low produced at the output terminal 327 of the network 310 produces via the inverter stage 321 a high at one input terminal of the "AND" gate 322 and simultaneously produces a low at one input of the AND gate 323. Each pulse 340 receives at the other input of both of the AND gates 322 and 323 produces a pulse at the output of the AND gate 322 only.

Of a number of pulses 340 applied to the hold system 320, each 64 pulse 341 produced at the output of the AND gate 322 produces a pulse 342 at the output of the divider 324. This pulse 342 at one input of the AND gate 325 concides with the 64 pulse 341 at the other input thereof to produce a pulse 343 at the output thereof. This pulse 343, in turn, produces a selection pulse 344 at the output of the OR gate 326 which is fed to coupling transistors 308 and 307 of the sample and hold circuit 302 to switch transistor 304 ON and is also fed to each of the storage elements 4, 8 and 12 of the BCD decade counter and display unit via the terminal 15 to update the information present at the outputs of each of the storage elements.

When the vehicle accellerates or decellerates the output voltage of the frequency-to-voltage converter 301 changes as illustrated in FIG. 16a. This change is represented by, in the case of acceleration, of an increasing voltage on the source electrode of transistor 304. When transistor 304 is switched by a selection pulse produced at output of the OR gate 326 of the hold system 320, the voltage on the source electrode at the time of switching is stored on capacitance 306.

The instant that the transistor 304 is switched ON, both inputs to the differential amplifier 311 are equal and accordingly the transistor 313 is always off at this instant and a low is produced at the terminal 327. However, if the vehicle is accellerating or decellerating, the output voltage of the converter 301 will be increasing or decreasing. Since one input of the differential amplifier is directly connected to the output of the converter 301 whereas the other input is connected to the output of the converter 301 via the sample and hold system 302 then owing to the action of the capacitance 306 the voltage at the terminal 309 and hence one input of the amplifier 311 will remain substantially constant despite the increase or decrease of the output voltage of the converter 301. Thus the difference amplifier will become unbalanced as a result of the increase or decrease of the output voltage of the converter 301 being transmitted to only one of the inputs of the differential amplifier 311 and a voltage will be supplied by the bridge 312 forward biassing the transistor 313. When the transistor 313 is sufficiently forwardedbiassed as a result of this difference to be switched ON, transistor 314 is switched ON and a high is thus produced at the output of the network 310 and at the terminal 327.

When the output of the network 310 is high, the AND gate 322 is inhibited and the AND gate 323 is open. Consequently, each pulse 340 received from the generator 170 when the AND gate 323 is open, is fed directly to the OR gate 326 and hence via terminal 15 to each of the storage elements of the BCD decade counter and display unit and also to the sample and hold circuit 302.

As previously mentioned, the FIGS. 16a to 16h portray wave forms present at the various parts of the apparatus of FIG. 15 under various conditions. During the time $t10$, the vehicle is moving at a constant speed, during the time $t11$ the vehicle is accellerating, during the time $t12$ the vehicle is again moving at a constant speed, during the time $t13$ the vehicle is decellerating and during the time $t14$ the vehicle is again moving at a constant speed.

Thus, during the time $t10$, since the vehicle speed is constant, a low but constant voltage is produced at the output of the converter 301 and the differential amplifier 311 remains in a balanced condition so that the terminal 327 is in the low state and a pulse is produced at the terminal 330 for every 64 pulse from the generator 170 and accordingly the BCD decade counter and display unit is updated at a relatively low repetition frequency.

During the time t11, since the vehicle is accellerating, an increasingly positive voltage is produced at the output of the converter 301 and the differential amplifier 311 is repeatedly unbalanced following application of each pulse 344 from the terminal 330 so that the terminal 327 in the high state and a pluse is produced at the terminal 330 for every pulse from the generator 170 and accordingly the BCD decade counter and display unit is updated at a relatively high frequency. Of course, the rate of accelleration must be in excess of a predetermined rate determined by the characteristics of the converter 301 and those of the differential amplifier 311 for a sufficiently positive voltage to be produced by the bridge 312 to cause the terminal 327 to be in the high state and for rapid updating to occur.

During the time t12, since the vehicle speed is constant once more, the conditions described for time t10 are repeated. However, the recurrence rate of the input signal pulse train at terminal 1 is greater and so the apparatus indicates the higher speed of the vehicle.

During the time t13, the vehicle is decellerating and a decreasingly positive voltage is produced at the output of the converter 301 and the differential amplifier 311 is again repeatedly unbalanced following application of each pulse 344 from the terminal 330 so that the terminal 327 is in the high state and a pulse is produced at the terminal 330 for every pulse from the generator 170 and again the BCD decade counter and display unit is updated at a relatively high frequency.

During the time t14, the vehicle is again at a constant speed and the conditions described for t10 are repeated again. This time however, the recurrence of the input signal pulse train is less than during the time t12 and the apparatus indicates the lower speed of the vehicle, indication being updated at a relatively low repetition frequency.

Of course, as in the case of the apparatus of FIG. 7, the apparatus of FIG. 15 is such that above a predetermined low speed, each sampling pulse produced at the terminal 15 is in a fixed time relationship to a pulse of the input signal pulse train at terminal 1 so that when the vehicle is travelling at a constant speed the indication produced does not alternate between neighbouring digits. Of course, the unit 150, 160 and 170 ensure that below a predetermined low speed, there ceases to be a fixed time relationship between each sampling pulse produced at the terminal 15 with a pulse of the input signal pulse train. Instead, the generator 170 is periodically initiated so that an indication is produced by the apparatus even when the vehicle is at a stand-still.

In an alternative form of the apparatus of FIG. 15, the unit 300 may be replaced by the unit 350 as illustrated in FIG. 17.

In this form, the output of the frequency-to-voltage converter 351, which output is proportional to the speed of the vehicle, is coupled to the respective inputs of a differential amplifier 354 via a first resistive-capacitive network 352 and a second resistive-capacitive network 353. The time constant of the first resistive-capacitive network 352 is arranged to be larger than that of the resistive-capacitive network 353.

The collector electrodes of transistors 355 and 356 comprising part of the differential amplifier 354 are connected to the emitter electrodes of n-p-n transistors 357 and 358 respectively. The emitter electrode of each transistor 357 and 358 is resistively coupled to the base electrode of each transistor 358 and 357 respectively, and the collector electrodes of these transistors are connected and coupled to the base electrode of transistor 357, which transistor operates as a simple switch.

The output of the unit obtained from the emitter electrode of transistor 349 is coupled to the two state hold system 320 in the manner described hereinbefore with respect to the apparatus of FIG. 12.

When the vehicle is travelling at a substantially constant speed, the output of the frequency-to-voltage converter is constant and accordingly the potentials at the collector electrodes of transistors 355 and 356 are substantially equal. In this condition, transistors 357 and 358 are arranged to be biassed in the off state. Therefore, the output of the unit 350 is low and the two hold systems 320 provides triggering of the storage elements 4, 8 and 12 of the BCD decade counter and display unit (not shown) at relatively long intervals.

However, when the vehicle is either accellerating or decellerating, the output of the frequency-to-voltage converter 351 is increasing or decreasing respectively. Accordingly, the base potentials of transistors 355 and 356 are changing at different rates due to the time constants of the two resistive-capacitive networks 352 and 353. Therefore, a potential difference is created between the collector electrodes of transistors 355 and 356. In this condition, transistors 357 and 358 are arranged such that one transistor is switched on and thus a high is fed to transistor 359 to switch transistor 359 on. The high produced at the output of the hold system 320 provides triggering of the storage elements 4, 8 and 12 of the BCD decade counter and display unit (not shown) at relatively short intervals.

Many variations of the embodiment of the invention described in relation to FIGS. 2 to 17 will be apparent to persons skilled in the art and such variations are intended to be included within the scope of the present invention.

I claim:

1. In a speed measurement and indication apparatus of the type wherein a counter is adapted to count the number of pulses of a signal pulse train occurring during each of a succession of measurement intervals of fixed duration, the pulse recurrence frequency of the signal pulse train being related to the speed to be measured and indicated; an indicator displays in digital form the information present at the output of a gated storage circuit the input of which is supplied with the counter information; a sampling pulse source supplies sampling pulses to the storage circuit, and wherein the storage circuit is arranged to be so gated by the sampling pulses applied thereto that during the presence of a sampling pulse the input information of the storage circuit is transferred to the output thereof while the input information present at the time of cessation of the sampling pulse is retained at the output of the storage circuit until the occurrence of the next succeeding sampling pulse, each applied sampling pulse being substantially coincident with termination of a measurement interval, wherein the improvement comprises frequency responsive means for providing a control signal corresponding to the magnitude of a change in the frequency of said signal pulse train, and control means for increasing the sampling rate of said sampling pulse source in response to said control signal, whereby the recurrence rate of the applied sampling pulses is determined by the rate of change of speed to be measured.

2. A speed measurement and indication apparatus as claimed in claim 1 wherein the control means comprises means for increasing and decreasing the recurrence rate of the applied sampling pulses substantially continuously with increase or decrease of the rate of change of the speed being measured.

3. speed measurement and indication apparatus as claimed in claim 1 wherein the control means comprises means for increasing and decreasing the recurrence rate of the applied sampling pulses in a stepwise manner with increase or decrease of the rate of change of the speed being measured.

4. A speed measurement and indication apparatus as claimed in claim 1 wherein the sampling pulse source comprises a reference pulse generator means for producing a first reference pulse train and a second reference pulse train, the pulses of the second reference pulse train having a fixed time relationship to the pulses of the first reference pulse train, means for resetting said counter to zero at the occurrence of each pulse of the first reference pulse train, and said sampling pulses being derived from pulses of the second reference pulse train.

5. A speed measurement and indication apparatus as claimed in claim 4 wherein said control means comprises a variable frequency pulse generator for providing a variable frequency pulse train of pulses having a duration substantially equal to the period of the said reference pulse generator, and a coincidence circuit fed by the variable frequency pulse train and by the second reference pulse train for producing sampling pulses which are supplied to the gated storage circuit, a sampling pulse being supplied at each occurrence of a pulse of a pulse of the second reference pulse train substantially within the duration of a pulse of the variable frequency pulse train.

6. A speed measurement and indication apparatus as claimed in claim 4 wherein said control means includes pulse frequency dividing means via which sampling pulses may be derived, and means for selectively supplying said first pulse train directly to said gated storage circuit on to said gated storage circuit through said pulse frequency dividing means in response to said control signal from said frequency responsive means.

7. A speed measurement and indication apparatus as claimed in claim 1, further comprising a synchronizing means arranged to receive the signal pulse train for initiating, in response to a pulse of the signal pulse train occuring subsequent to a count interval, a further count interval and for producing a sampling pulse substantially coincident with the termination of the further count interval, whereby each sampling pulse terminates a measurement interval the commencement of which is the commencement of the count interval with which the sample pulse is associated.

* * * * *

PO-1050
(5/69)

UNITED STATES PATENT OFFICE
CERTIFICATE OF CORRECTION

Patent No. 3,863,153      Dated January 28, 1975

Inventor(s) KAMRAN ESHRAGHIAN

It is certified that error appears in the above-identified patent and that said Letters Patent are hereby corrected as shown below:

ON THE TITLE PAGE

"[30]    Foreign Application Priority Data

Nov. 10, 1971   Australia................6954/71"

should read

--[30]    Foreign Application Priority Data

Nov. 10, 1971   Australia---------------PA6954/71--;

IN THE SPECIFICATION

Col. 9, line 17, after "signal" insert --pulse--;

Col. 12, line 67, "pulse" should be --pulses--;

Col. 16, line 15, "with" should be --width--;

Col. 19, line 61, "receives" should be --received--;

IN THE CLAIMS

Claim 3, line 1, before "speed" insert --A--;

Signed and sealed this 29th day of April 1975.

(SEAL)
Attest:

RUTH C. MASON
Attesting Officer

C. MARSHALL DANN
Commissioner of Patents
and Trademarks